(12) United States Patent
Howard

(10) Patent No.: US 7,689,436 B2
(45) Date of Patent: Mar. 30, 2010

(54) PERIPHERAL DEVICE OUTPUT JOB USER DATA PROCESSING

(75) Inventor: Dennis W. Howard, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2201 days.

(21) Appl. No.: 10/213,171

(22) Filed: Aug. 5, 2002

(65) Prior Publication Data

US 2004/0024649 A1 Feb. 5, 2004

(51) Int. Cl.
*G06Q 10/00* (2006.01)
*G06Q 30/00* (2006.01)
*G07G 1/12* (2006.01)
*G07G 5/00* (2006.01)

(52) U.S. Cl. .......................... 705/1.1; 705/24
(58) Field of Classification Search ............... 705/24
See application file for complete search history.

(56) References Cited

U.S. PATENT DOCUMENTS

| | | | |
|---|---|---|---|
| 6,216,113 B1 * | 4/2001 | Aikens et al. | 705/34 |
| 6,874,034 B1 * | 3/2005 | Hertling | 709/245 |
| 7,130,070 B2 * | 10/2006 | Evans et al. | 358/1.15 |
| 2002/0113993 A1 * | 8/2002 | Reddy | 358/1.15 |
| 2002/0174264 A1 * | 11/2002 | Fuller et al. | 709/321 |
| 2003/0140185 A1 * | 7/2003 | Cherry et al. | 710/15 |

OTHER PUBLICATIONS

Microsoft Press, "Computer Dictionary", 1994, Microsoft Press, Second Edition, pp. 7.*

* cited by examiner

*Primary Examiner*—F. Ryan Zeender
*Assistant Examiner*—Asfand M Sheikh

(57) ABSTRACT

A printer driver application is executed to form print data to be output at a peripheral device. User-specific data and the print data are addressed to an address of a queue to be output at the peripheral device. The user data can be an identification of a user requesting the output at the peripheral device, accounting information corresponding to the user, billing information corresponding to the user, a quantity corresponding to the print data, or a cost corresponding to the print data to be output at the peripheral device.

49 Claims, 4 Drawing Sheets

PERIPHERAL DEVICE OUTPUT JOB USER DATA PROCESSING

FIELD OF THE INVENTION

The present invention relates to outputting an output job at an output device such as a peripheral device. More particularly, the invention relates to routing an output job to a peripheral device.

BACKGROUND OF THE INVENTION

In many situations, an output device such as a peripheral device or a printer is coupled to a document processing device, such as a personal computer or a workstation, that helps render an output job (such as a print job) that is output by the peripheral device (e.g. printed by the printing device). The document processing device generates one or more output jobs to be output by the peripheral device. The document processing device can execute different kinds of applications each of which can generate an output job that can be output by the peripheral device upon a demand for same by a user. Prior to initiation of the demand for output, the user can input data, edit the data, delete the data, etc. For example, the output jobs can be generated by one or more application programs (e.g. word processing programs, electronic mail programs, drawing programs, spreadsheet programs, desk top publishing programs, etc.) executed by the document processing device.

The output jobs may include any type of graphical elements or information supported by the peripheral device, including text, pictures, and so forth. The document processing device typically translates the output job into a language that is understood by the peripheral device. Where the peripheral device is a printer, the language can be Printer Control Language (PCL) or Postscript. A particular peripheral device may understand a single language, thereby requiring the processing device to translate the output job into that single language. This type of peripheral device requires an attached processing device to convert the raw output job data into a format (i.e., language) that is understood by the peripheral device.

Some peripheral devices are capable of processing output jobs in multiple languages. These peripheral devices are typically more complicated because they are required to identify, interpret and process output commands in several different languages. Although these peripheral devices are more complicated, they typically require an attached processing device to provide the output job and other output control information to the peripheral device. Another type of peripheral device contains its own output rendering engine that is capable of generating an output document from raw output job data. Although this type of peripheral device contains its own output rendering engine, it is typically coupled to a document processing device, such as a computer, to receive the raw output job data generated, for example, by an application running on the computer.

The document processing device, typically in home and office environments, consistently communicates to one or more of the same peripheral devices each time that an output job is to be output thereon. In other situations, such as in mobile computing, the document processing device must direct output to a peripheral device upon which output has not been previously directed by the document processing device. To do so, the document processing device must have specific software corresponding to the specific peripheral device upon which the output job is to be output. By way of example, a specific printer driver must be installed on a personal computer (PC) that corresponds to a specific printer so that a document can be printed on the printer by executing a printing function of a document processing application executing on the PC. In that there are a great variety of printers and corresponding printer drivers that can be encountered in mobile computing, it is not likely that a personal computer would have all printer drivers installed thereon so as to readily direct print jobs to all corresponding printers. In practice, a time consuming process is required in which a PC user must determine the type of printer that is to be printed to through a service provider. Then, the PC user must locate and install a compatible printer driver on the PC that corresponds to the printer that the PC user wants to print on. This process must be repeated for each different kind of printer that the PC user needs to use. Moreover, the service provider typically employs the manually intensive, laborious, and somewhat inaccurate accounting and/or billing procedure of counting printed pages and minutes of printer usage in order to assess costs and estimate usage of the printer by the PC user. While each printer driver can be modified to put user-specific billing and/or accounting information into each print data job that is output, this solution is rarely practical because there are too many printer drivers, many of which can not be properly modified for the user-specific data uses of accounting and/or billing. Additionally, a print server may require different types of user-specific billing and/or accounting information so as to be useful for printing from many different printer drivers. Typically, the nexus between the printer driver and the print server that stores the print queue for each printer is lacking in usefulness due to shallow flexibility in getting the user-specific data. It would be advantageous to advance compatibility and ease of use between a document processing device, printer drivers and respective peripheral devices upon which an output job is to be output while providing an ability to capture user-specific accounting and/or billing data. Consequently, there is a need for improved methods, programs, client devices, print servers, and systems that can provide such a capability.

SUMMARY OF THE INVENTION

The above-stated needs and/or others are met, for example, by methods, programs, client devices, print servers, and systems in which a printer driver application is executed to form print data to be output at a peripheral device. User-specific data and the print data are addressed to an address of a queue to be output at the peripheral device.

DESCRIPTION OF THE DRAWINGS

In the drawings, the same reference numbers are used throughout the drawings to reference like components and features.

DETAILED DESCRIPTION

Figure 1:
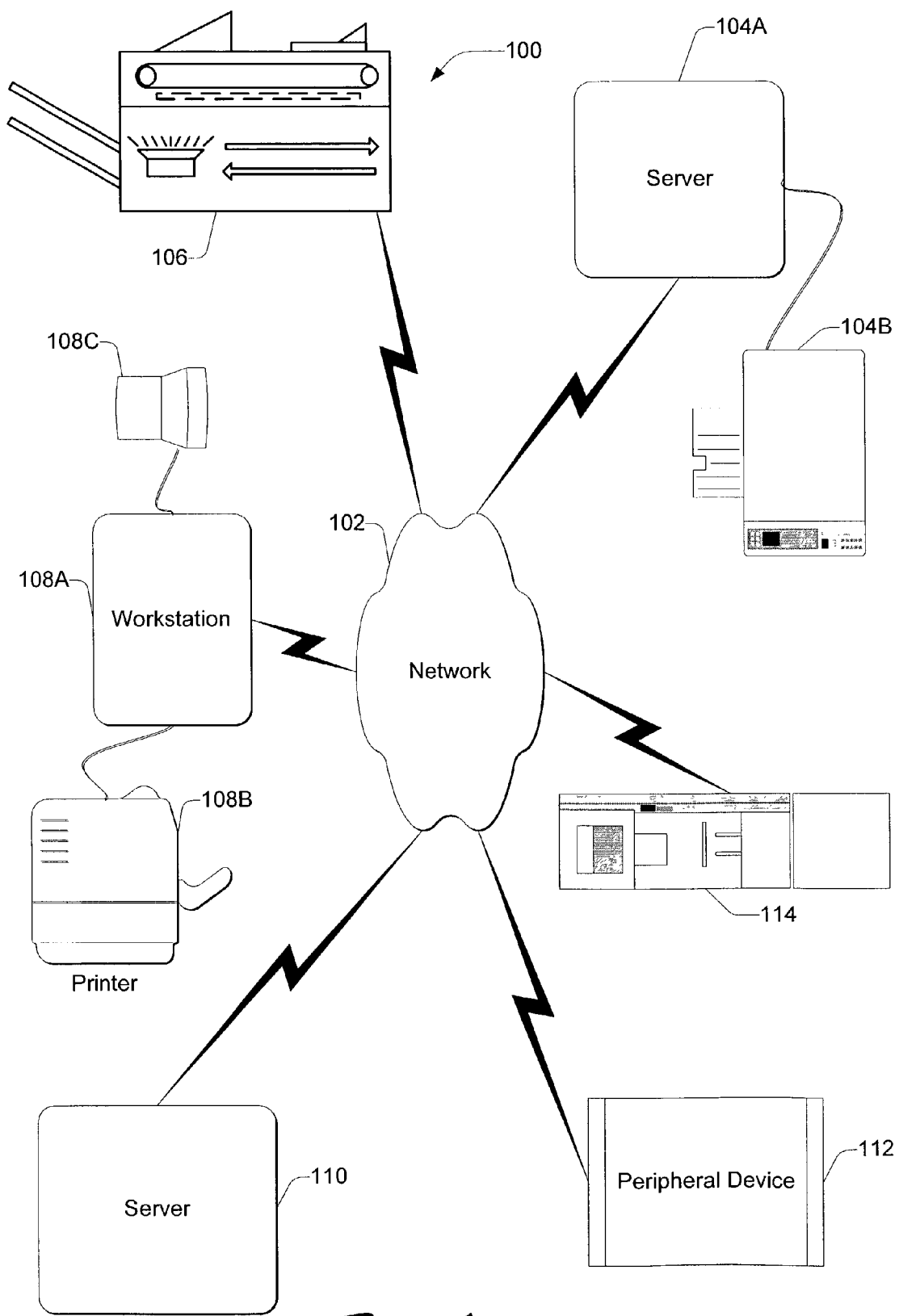
FIG. 1 illustrates a network environment in which multiple servers, workstations, and peripheral devices including printers are coupled to one another via an interconnected network.

The methods, programs, client devices, print servers, and systems, according to various embodiments of the present invention, relate to a client device or document processing device such as personal computer (PC) that executes a document processing application, such as a word processor application, that creates and/or stores a document that is to be output at a peripheral device, such as a printer. Where the PC has not previously directed a document for printing at the printer, the PC must first be set up. One such an environment that calls for the PC to be set up is in mobile computing. A typical mobile computing environment is that of a traveler who uses a laptop computer or other mobile computing device. The laptop computer has a document processing application installed thereon. The document processing application typically has a printer driver application that can be used to create a print data from a document that the traveler has stored and/or created. In order to print out the document, the traveler locates an available printer upon which to print the document. Public accommodations and meeting facilities, such as those often associated with the hospitality industry, often offer printers to guests for their use.

In order to print out on the available printer that the traveler has located, software is installed on the laptop computer. The software can include a driver-server interface application that can be obtained by copying from portable media or by download from an interconnected network that is also in communication with a print server and the printer that the traveler has located. The traveler then operates the document processing application to request the printing function thereof so as to obtain the desired print out on the located printer that the traveler specifies in requesting the printing function.

After the traveler has made this request, the document processing application executes the printer driver application to create print data from the document being processed by the document processing application. The driver-server interface application, which can be executed in background, adds data that is specific to the user (e.g. the traveler) to the print data. This user-specific data can include an identification of the user, accounting information corresponding to the user, and/or billing information corresponding to the user. By way of example, and not by way of limitation, the user can be identified by a password, log in, or hotel guest room identifier. The identification of the user can be used to assess costs and usage back to the user. The accounting information and/or the billing information can be, for instance, the user's credit card information, debit card information, and/or electronic funds transfer information.

The user-specific data can also include a quantity corresponding to the print data. By way of example, and not by way of limitation, the quantity can be the number of pages that need to be printed in order to accommodate all of the print data generated by the printer driver application and directed to the printer, or the quantity can be the logical size (e.g. measured in megabytes) of the print data.

A cost corresponding to the print data that is to be printed at the printer can be included in the user-specific data. By way of example, and not by way of limitation, the print data may call for color-related printing tasks that are typically more costly then grey-scale printing tasks. The print data may call for functions applicable to a network copier or digital press, such as binding, collating, folding, stacking, stapling, stitching, edge-trimming, paginating, and/or printing on substrates of varied composition. As such, the cost corresponding to the print data can provide a monetary assessment for printing the print data as a function of applicable costing factors.

The user-specific information can be acquired at the time that the driver-server interface application is installed, or at or before the time that the user requests the printing of the print data. A user interface can be provided through which the user can input the user-specific information. Alternatively, the traveler's host can input the user-specific information for storage on the print server that is accessible to the client device being used by the traveler through the interconnected network.

In one embodiment of the present invention, a traveler can request a print out on a printer at a hotel from a lap top computer connected to a network port in a hotel room in which the traveler is staying. The network port connects the lap top computer to a print server through an intranet at the Hotel or through the Internet. The print server receives a network transmission that includes print data generated by a printer driver application executing on the lap top computer. The print data can be stored in a print queue at the print server. The print server processes each print job in the print queue for printing at the hotel's printer. Billing and accounting information specific to the traveler, which can be included in the transmission or pre-acquired for storage at the print server, can be used by the print server to make monetary and/or usage assessments against the traveler's hotel room bill or invoice for services rendered with respect to the hotel's printer. These assessments can be made as a function of the size and complexity of the requested printing function, which can be related a quantification of the print data transmitted to the hotel printer through the print server. Once the requested printing has been made at the hotel's printer, the traveler can retrieve the print out or can have the print out delivered by the hotel concierge or through room service, for example. When the traveler quits his tenancy at the hotel, a bill or invoice for services is presented to the traveler for payment. The bill or invoice includes the requested printing services rendered by the hotel.

FIG. 1 illustrates a network environment 100 in which a plurality of network resources are in communication via an interconnected network 102. As such, multiple servers 104A, 110, workstations 108A, and peripheral devices 104B, 106, 108C, 108B, 112, 114 are coupled to one another via interconnected network 102. Interconnected network 102 couples together servers 104A and 110, computer workstations 108A, printers 104B, 106, 108B, 112, and 114, and a computer monitor 108C. Printers 104B, 108B and computer monitor 108C are coupled to interconnected network 102 through their respective local connections to server 104A and workstation 108A. Interconnected network 102 can be any type of network, such as a local area network (LAN) or a wide area network (WAN), using any type of network topology and any network communication protocol. In a particular embodiment, interconnected network 102 can be the Internet. Although only a few devices are shown coupled to interconnected network 102, a typical network may include tens or hundreds of devices coupled to one another. Furthermore, interconnected network 102 may be coupled to one or more other networks, thereby providing coupling between numerous devices.

Servers 104A and 110 may be print servers, e-mail servers, database servers, file servers, or any other type of network resource. Workstation 108A can be any type of computing device, such as a mobile computing device, including a personal computer, a laptop computer, and a personal digital assistant (PDA). Although not shown in FIG. 1, one or more workstations and/or servers may contain a print rendering engine capable of converting raw print job data into a particular format (e.g., language) understood by certain types of printers.

Particular embodiments of the invention illustrate an ink jet printer 104B and laser printers 106, 108B. Alternate embodiments of the invention, however, are implemented with other output devices such as with peripheral device 112 that is illustrated as being in communication with interconnected network 102 independent of a server or workstation. Peripheral device 112 is intended to represent an output device to which output can be directed from a computing device, including but not limited to, laser printers, ink-jet printers, bubble-jet printers, copiers, and fax machines. Additionally, peripheral device 112 can be any type of device that can output an output job, including by soft copy such as by video display or by hardcopy such as on paper, and any other type of printer including those referred to above. A digital press or network copier 114 is seen in FIG. 1 as a peripheral device to which output can be direct according to an embodiment of the present invention.

Figure 2:
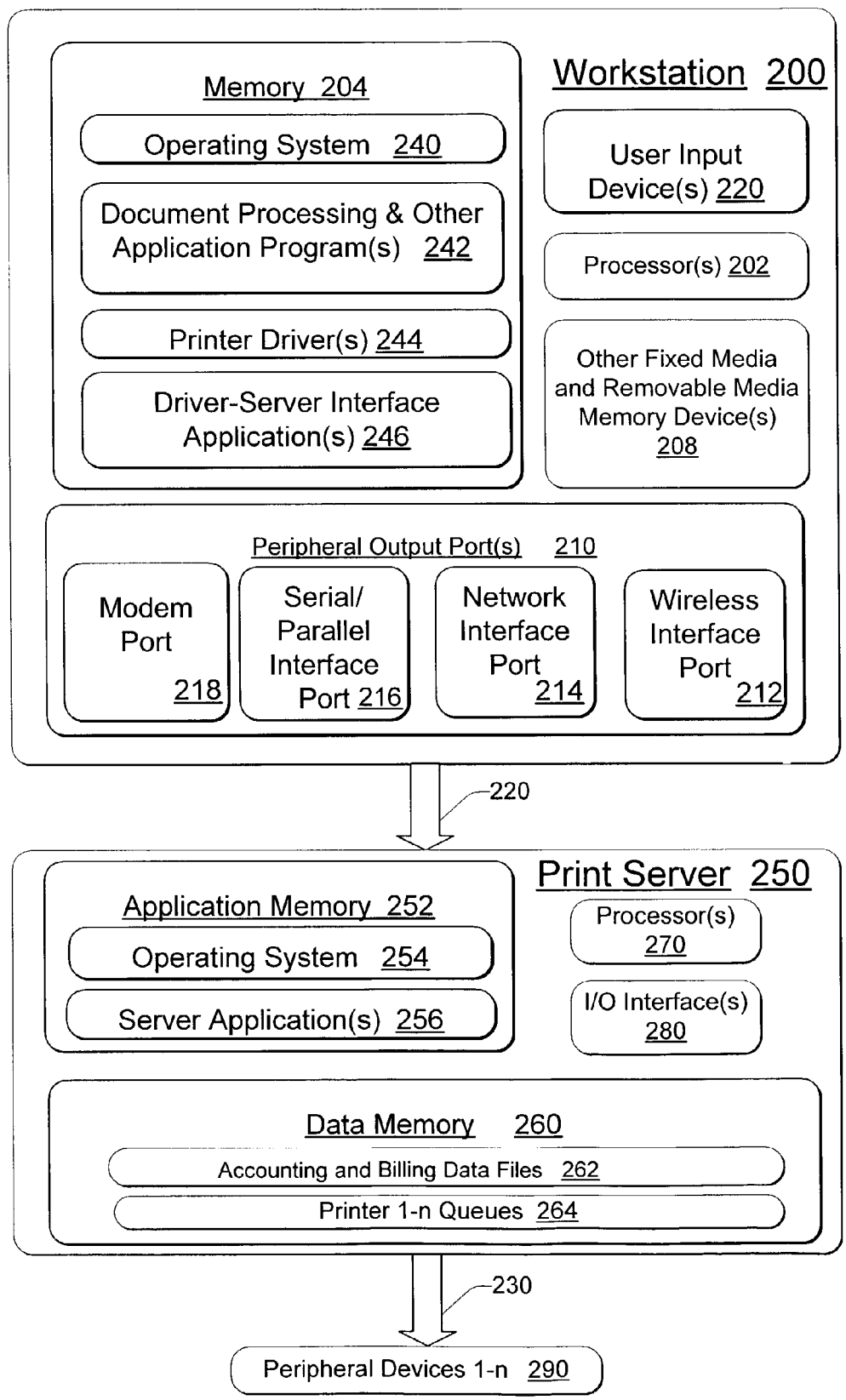
FIG. 2 is a block diagram showing pertinent components of a computer workstation for outputting to a peripheral device in accordance with certain exemplary embodiments of the present invention.

FIG. 2 is a block diagram showing pertinent components of a computer workstation 200 in accordance with the present invention. Workstation 200, which is a client device, includes one or more processors 202, a data memory 204, and other fixed media and removable media memory devices 208. Memory devices 204 and 208, which provide data storage mechanisms, can be read-only memory (ROM), random access memory (RAM), a hard drive, a floppy disk drive, a CD-ROM drive, and other conventional memory device, and can be used to store an output buffer that contains a rendered version of a document, a bitmap of an image of one or more pages or segments of a document, or other versions of the document as is appropriate for a particular outputting environment. Other storage uses include a print spool or print buffer.

The one or more processors 202 perform various instructions to control the operation of workstation 200. The instructions can be in applications that can be stored in memory devices 204 and 208. These applications include an operating system 240 and one or more document processing and other application program(s) 242. The document processing application programs process a document and can include programs such as word processing programs, electronic mail programs, drawing programs, spreadsheet programs, slide show programs, and desk top publishing programs, where some applications can include a spooler component. Also included in the applications executed by the one or more processors 202 are one or more printer drivers 244 and one or more driver-server applications 246. When executed by the one or more processors 202, each printer driver 244 outputs print data to one or more of the driver-server applications 246 for further processing.

One or more peripheral output ports 210 provide a mechanism for workstation 200 to communicate with other devices. The one or more driver-server applications 246, when executed, direct addressed print data and user-specific data to one or more peripheral output ports 210, which can be a wireless interface port 212, a network interface port 214, a serial port/parallel port 216, and/or a modem port 218. User input device(s) 220 can be used for inputting and outputting data. User input device(s) 220 include a keyboard, mouse, pointing device, or other mechanism for inputting information to workstation 200.

Workstation 200 can include one or more rendering engines in the one or more document processing and other application program(s) 242. Each rendering engine can be executed by the one or more processors 202 so as to be capable of processing print data into a format understood by respective peripheral devices so as to be output therefrom. Similarly, the servers 104A, 110 and the workstation 108A seen in FIG. 1 can include respective rendering engines that can process raw data into a language understood by any printer or peripheral device connected on the network 102. These rendering engines can be capable of rendering a document into a directly printable format by incorporating any fonts, templates, or other data required to render the document.

Peripheral Output Port(s) 210 transmit the addressed print data and user-specific data to an interconnected network represented in FIG. 2 at an arrow 225 for transmission to a print server 250. Print server 250, which is a computing device, includes one or more processors 270, an application memory 252, and a data memory 260. Memory devices 252 and 260, which provide data storage mechanisms, can be read-only memory (ROM), random access memory (RAM), a hard drive, a floppy disk drive, a CD-ROM drive, and other conventional memory device, and can be used to store data as is appropriate for a particular outputting environment. Other storage uses include a print spool or print buffer. Data memory 260 includes accounting and billing data files 262. Each accounting and billing data file 262 contains user-specific information that can be used for accounting and/or billing purposes. In particular, printing services that are provided to a requesting user can be assessed using the corresponding accounting and billing data file 262 for the respective requesting user. Data memory 260 also includes a queue for each of one or more printers 1-n at reference numeral 264. When print data is received from the interconnected network represented in FIG. 2 at arrow 225, the print data is stored in a print job at a respective print queue for the printer at which the print data is to be printed. Print server 250 processes each print job in each print queue 264 by executing an application for the printing function using the one or more processors 270.

The one or more processors 270 perform various instructions to control the operation of print server 250. The instructions can be in applications stored in application memory 252, and include an operating system 254 and one or more server applications 256. When user-specific data is received with print data for a print job from the interconnected network represented in FIG. 2 at an arrow 225, the one or more server applications 256 perform accounting and billing functions using the user-specific data, a corresponding accounting and billing data file 262 in data memory 260, the size of the print data, and other cost-related considerations.

One or more input/output (I/O) interfaces 280 receive data through the interconnected network represented in FIG. 2 at an arrow 225 and transmit print data through one or more (I/O) interfaces 280 to one or more peripheral devices 1-n 300. The one or more server applications 256, when executed by the one or more processors 270, direct addressed print data to one or more peripheral devices 1-n 300 from the one or more input/output interfaces 280 through an interconnected network or other connection seen in FIG. 2 at reference numeral 235. Each peripheral device 300 can be a multifunction peripheral (MFP), a digital network copier, a digital press, a laser printer, an ink-jet printer, or other peripheral device connected on the network 102.

The data in each accounting and billing data file 262 can be maintained by operation from workstation 200, print server 250, or other work station or server seen in the network environment 100 of FIG. 1. This maintenance can include the specification of directories in a file system that are to be used to accomplish accounting, billing, and/or printing functions.

The formatting requirements of each print job in each print queue 264 can also be maintained by print server 250 so that all or a portion of each print job can be printed according to the formatting requirements of a particular printer or peripheral device 300 that is designated by a user. This maintenance can be performed by a network administrator who also can set up addresses for a bank of printers having specific capabilities (e.g. color printing, high volume printing). As such, a user wanting to print a print job need only specify the capabilities of a printer rather than identifying a specific printer or IP address of a printer. The network administrator can remotely change specific peripheral devices to enable and disable output thereto, such as when a printer is malfunctioning and printing must to directed to a different printer having similar capabilities. Different printers can be designated to correspond to respective I/O interface(s) 280 by configuration tasks performed by the network administrator so as to direct printing functions in an efficient manner.

Figure 3:
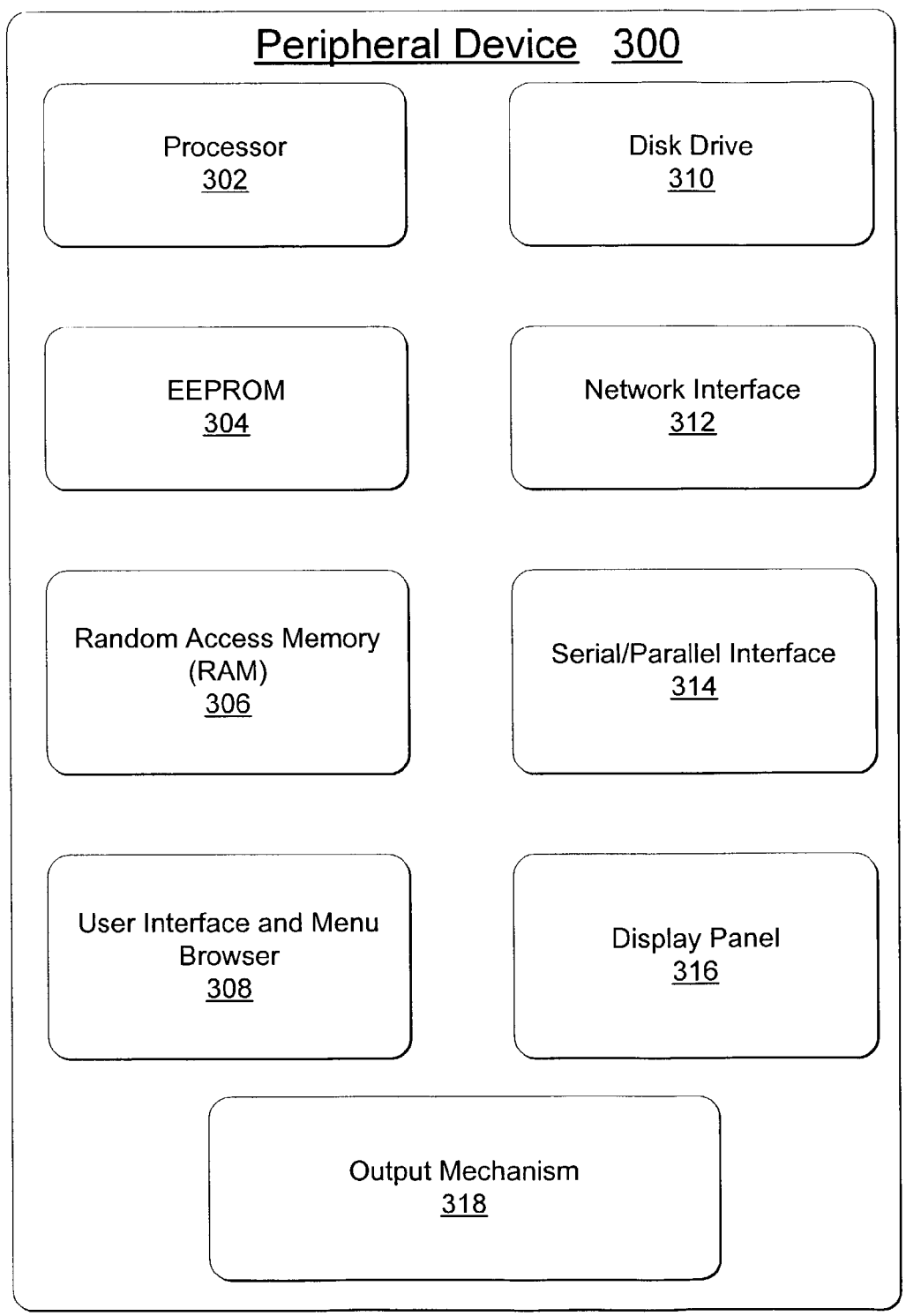
FIG. 3 is a block diagram showing pertinent components of a peripheral device in accordance with certain exemplary embodiments of the present invention.

FIG. 3 is a block diagram showing pertinent components of a peripheral device 300 that can be used to output an output job. For example, peripheral device 300 can be a printer that includes one or more processors 302, hardware components of a printing device in an output mechanism 318, an electrically erasable programmable read-only memory (EEPROM) 304, and a random access memory (RAM) 306. The one or more processors 302 process various instructions necessary to operate peripheral device 300 and communicate with other devices. EEPROM 304 and RAM 306 can be used to store various types of information such as configuration information, fonts, templates, data being printed, and menu structure information. Although not shown in FIG. 3, a particular peripheral device may also contain a ROM (non-erasable) in place of or in addition to EEPROM 304.

Peripheral device 300 can optionally include a disk drive 310, a network interface 312, and a serial/parallel interface 314. Disk drive 310 provides additional storage for data being printed or other information used by peripheral device 300. Although both RAM 306 and disk drive 310 are illustrated in FIG. 3, a particular peripheral device may contain either RAM 306 or disk drive 310, depending on the storage needs of the peripheral device. For example, an inexpensive printer may contain a small amount of RAM 306, no disk drive 310, and a modest print engine, thereby reducing the manufacturing cost of the printer. As such, to print most documents, peripheral device 300 will require assistance from a rendering engine can that be found in a server or workstation with which peripheral device 300 is in communication.

The storage needs of the peripheral device may require the storage of a printer engine in any of the storage components described above. In one embodiment of the invention, peripheral device 300 stores an output buffer containing a pre-rendered document in one or more of RAM 306 and disk drive 310. In another embodiment of the invention, peripheral device 300 has a memory for storing a pre-rendered document received from an output buffer, where peripheral device 300 formats the pre-rendered document so that it can be output by output mechanism 318.

Network interface 312 provides a connection between peripheral device 300 and a data communication network, such as interconnected network 102 seen in FIG. 1. Network interface 312 allows devices coupled to a common data communication network to send print jobs and other information to peripheral device 300 via the network. Similarly, serial/parallel interface 314 provides a data communication path directly between peripheral device 300 and another device, such as a workstation, server, or other computing device. In one embodiment of the present invention, work station 200 seen in FIG. 2 can direct data for printing from one or more peripheral output ports 210 through print server 250 via interconnected network 102 see in FIG. 1 to network interface 312 of peripheral device 300 to be printed out. Although the peripheral device 300 shown in FIG. 3 has two interfaces (network interface 312 and serial/parallel interface 314), a peripheral device may only contain one interface. Additionally, the interface can be other types of interfaces known in the art, such as Universal Serial Bus (USB), IEEE 1394, etc.

Peripheral device 300 can also contain a user interface/menu browser 308 and a display panel 316. User interface/menu browser 308 allows the user of peripheral device 300 to navigate a menu structure that is on display panel 316. User interface 308 may be a series of buttons, switches or other indicators that are manipulated by the user of peripheral device 300. Display panel 316 can be a graphical display that provides information regarding the status of peripheral device 300 and the current options available through the menu structure. In a particular embodiment of the invention, the display panel 316 is a liquid crystal display having a two-dimensional array of pixels capable of generating various fonts, icons, and other images. In one implementation of the invention, user interface 308 is a touch-sensitive screen that overlays display panel 316. Thus, the user can provide input to peripheral device 300 by touching the appropriate portion of the touch screen. The touch screen is substantially transparent such that the images displayed on panel 316 are visible to the user through the touch screen. The touch screen may be used in combination with one or more physical buttons or switches on peripheral device 300.

The display panel 316 of peripheral device 300 displays various menu options to the user of peripheral device 300. The display panel 316 and associated control buttons allow the user of peripheral device 300 to navigate, for instance, a menu structure that has a hierarchy of menu elements. When one of the menu elements is selected, the display changes to illustrate the new menu elements in the next level of the hierarchy. Alternatively, if the selected menu element is a function or other action to be performed by peripheral device 300, the appropriate procedure is performed. For example, if the selected menu element outputs a particular document, then peripheral device 300, serving in the role of a peripheral device, performs the necessary operations to output the output job, such as by outputting a formatted version of a rendered document that is received by transfer from an output buffer or through network interface 312 from a data communication network.

Figure 4:
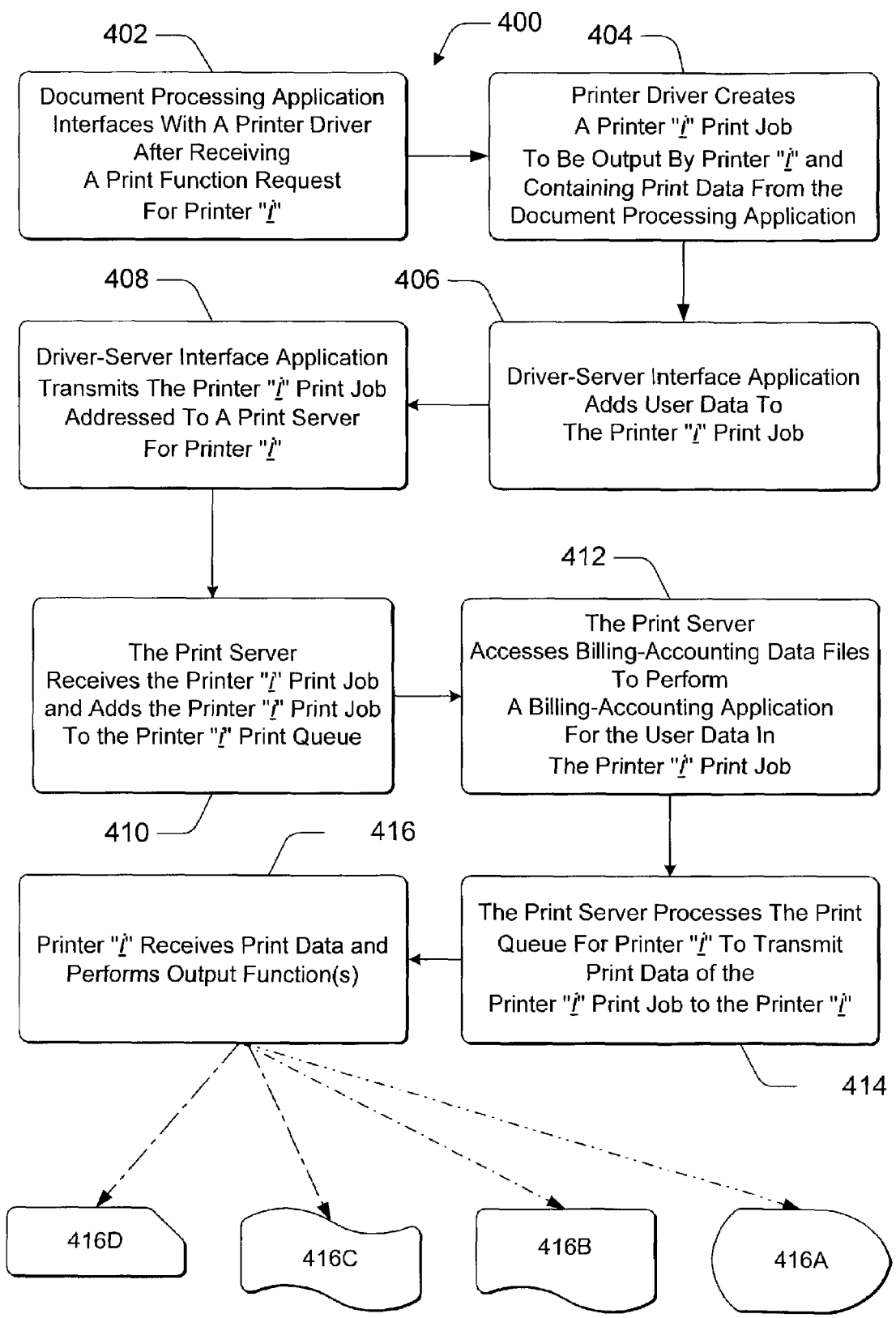
FIG. 4 is a flow diagram illustrating a procedure for processing a particular output job.

FIG. 4 is a flow diagram illustrating an embodiment of the present invention as depicted in a procedure 400 for processing a particular output job. Procedure 400 begins at block 402 where a document processing device executes a document processing application on one or more processors. A user can open a document using an operation of the document processing application. When the user wishes to output the document, the user inputs a request to the document processing application so as to initiate a print function. The input from the user specifies a particular peripheral device or printer "i" upon which the document is to be output or printed. The document processing application can be a word processing application (e.g. Word® software from Microsoft Corporation), a financial application (e.g. Money® software from Microsoft Corporation), a network browser (e.g. Internet Explorer® software from Microsoft Corporation), a network messaging application, a spreadsheet application (e.g. Excel® software from Microsoft Corporation), a data base maintenance application (e.g. Access® software from Microsoft Corporation), or slide show application (e.g. Power Point® software from Microsoft Corporation), where the user of the document processing application specifies a particular peripheral device (e.g. printer) at which to output a document.

At block 404, a printer driver creates print data in a print job that is specified to be printed with the printer "i", or a printer "i" print job. The printer driver submits the printer "i" print job to a driver-server application at block 406. The driver-server application is executed on the one or more processors at block 406 to add user data to the printer "i" print job. The user data can include, among other data, billing and/or accounting information related to the user and/or the printer "i" print job. At block 408, the printer "i" print job is transmitted by the driver-server application to an address of a print server for the printer "i".

At block 410, the printer "i" print job is received at the address of the print server designated for printer "i". The print server for printer "i" processes the printer "i" print job at block 412 by accessing one or more billing-accounting data files corresponding to the printer "i" print job and by using the data so accessed to perform one or more billing-accounting applications. As such, the print server performs the function of charging the user for their usage of the printer "i" and/or monetary assessments associated with outputting the printer "i" print job.

Print data in the printer "i" print job is placed into a print queue for the printer "i" at block 414. In a predefined processing order, the print server processes and transmits to a respective peripheral device each print job in each print queue for each peripheral device, including the printer "i" print job. The print data that is transmitted to printer "i" can be print data that is specifically altered or formatted. Such an alteration or formatting can be made so that the print data will be specifically compatible to the requirements of printer "i". The compatibility requirements and accomplishment thereof can be stored in and obtained from the originating workstation and/or the print server.

The printer "i" receives the printer "i" print job at block 416 and performs corresponding output functions so as to output therefrom the requested printer "i" print job, such as in a printed report. Alternatively, printer "i" can be varied kinds of peripheral devices that can output a report. The output at printer "i" may require some specific formatting or pre-processing to be performed by printer "i" prior to the report being produced. The report requested can be made with a hardcopy printed report 416B, a continuous printout such as a ticker tape 416C, or other hardcopy such as a punch card 416D. Alternatively, the output can be directed to a video projection or display device 416A so as to output a soft copy of the requested document.

Following the outputting of the printer "i" print job by the printer "i", the printer "i" print job can be removed from the corresponding print queue at the print server, such as by logically and/or physically purging. Procedure 400 can be repeated for each document processed by a client device making a request for a print job in which a peripheral device receives input and outputs a report or hardcopy.

The order in which the method is described with respect to procedure 400 is not intended to be construed as a limitation, and any number of the described method blocks can be combined in any order to implement the method. Furthermore, the method can be implemented in any suitable hardware, software, firmware, or combination thereof.

When procedure 400 is operated in an environment where the document processing device is a PC and the peripheral device is a printer, several parameters of operation can be implemented within the context of the rendering of the document in the PC and the rendering of the document in the printer. To process an entire print job, the printer may need the ability to interpret a language or format in which the document is stored. For example, if the document data is stored in a raw data format and the printer only understands the Printer Control Language (PCL) language, then the printer cannot process the document until some other device or process converts the raw data into a PCL format. Here, the PC can be this device or perform this process. However, if the document is already stored in a format that is understood by the printer, then the printer can process the document without assistance from an external device. If the printer can process the entire print job, then the document is printed by the printer. If the printer cannot process the entire print job, then the portions of the document (i.e., print job) that it cannot process are delegated to other processing devices.

In a particular embodiment of the present invention, the printer can only render documents that are formatted in the native language of the printer. Thus, the printer may require all portions of a particular print job to be processed by the PC if all portions of the print job are in a non-native language of the printer. By supporting only a native printing language, the cost of such a printer is reduced.

The document that can be output can have many forms. For instance, the document can be a letter containing text that is being edited by a word processing program, an electronic mail (e-mail) message that is being created by an e-mail program, a drawing that is created by the user by operating a drawing program, a spreadsheet that the user is constructing by operating a spreadsheet program, or a poster that is being designed by a user by operating a desk top publishing program. Other types of documents are also contemplated for use in embodiments of the present invention.

In one embodiment of the present invention, the peripheral device can be a printer, such as a simple dot matrix printer or a complex printer such as a digital press or a network printer. Complex printers can have capabilities that include high quality photo reproduction, multi-section reports with tabs, in-line mixed material insertion such as insertion of full-color preprinted copies and digital color-page insertion. Other complex printer capabilities include printing on substrates of varied composition, such as embossed, heavy-weight, multi-weight, and cover paper stock, as well as carbonless paper, blue prints, clear or colored transparency printing, and other specialty stock including preprinted offset color covers. Still other complex printer capabilities includes binding, collating, folding, stacking, stapling, stitching such as saddle stitching, edge-trimming, paginating for multi-language, and inline pagination and annotation. Still another printer is a multifunction peripheral (MFP), sometimes referred to as an "All-In-One", which combines two or more peripheral devices into a single device, such as printing, scanning, copying, and facsimile transmission. The printer can be a Graphical Display Interface (GDI) printer or a printer interpreting a page description language.

In another embodiment of the present invention, the document processing application executes on the processor of the document processing device to form a bitmap image of a document that is communicated to the peripheral device through both the print server and the interconnected network. In still another embodiment of the present invention, the document processing application includes a spooler for spooling print jobs that are to be communicated to the peripheral device through both the print server and the interconnected network via a hardware port on a PC.

Thus, although some preferred embodiments of the various methods, programs, client devices, and systems of the present invention have been illustrated in the accompanying Drawings and described in the foregoing Detailed Description, it will be understood that the invention is not limited to the exemplary implementations disclosed, but is capable of numerous rearrangements, modifications and substitutions without departing from the scope of the invention as set forth and defined by the following claims.

What is claimed is:

1. A computer-readable medium having computer-executable instructions which, when executed on a processor, direct a computer to perform a method comprising:
   receiving user-specific data corresponding to billing information for a user;
   receiving a print job containing print data from a printer driver application to be output at a peripheral device;
   modifying the print job to add the user specific data; and
   addressing the modified print job to a network resource for:
      processing the user-specific data to assess the user with charges; and
      storage of the print data in an output queue to be output at the peripheral device.

2. The computer-readable medium as defined in claim 1, wherein the method further comprises transmitting the modified print job to the network resource.

3. A computer-readable medium having computer-executable instructions which, when executed on a processor, direct a computer to perform a method comprising:
   executing a printer driver application to form a print job containing print data to be output at a peripheral device;
   accessing user data selected from the group consisting of:
      accounting information corresponding to the user;
      billing information corresponding to the user; and
      a cost corresponding to the print data to be output at the peripheral device;
   modifying the print job to add the user data; and
   transmitting the modified print job in a transmission addressed to an address of a queue to be output at the peripheral device.

4. The computer-readable medium as defined in claim 3, wherein the method further comprises:
   executing a document processing application processing a document that contains information;
   receiving a request to output the document at the peripheral device;
   invoking, in response to the request, the execution of the printer driver application; and
   wherein the execution of the printer driver application further comprises forming the print data from the information in the document.

5. The computer-readable medium as defined in claim 3, wherein the address is an Internet address.

6. The computer-readable medium as defined in claim 3, wherein the address is a network address on a local area network.

7. The computer-readable medium as defined in claim 3, wherein the method further comprises transforming the print data into a format that is required to for outputting by the peripheral device.

8. A computer-readable medium having computer-executable instructions which, when executed on a processor, direct a computer to perform a method comprising:
   receiving a request to print at a printer;
   executing a printer driver application, invoked by execution of a document processing application processing a document that contains information, to form a print job containing print data from the information in the document to be printed at the printer;
   accessing user data selected from the group consisting of:
      accounting information corresponding to the user;
      billing information corresponding to the user; and
      a cost corresponding to the print data to be printed at the printer;
   modifying the print job to add the user data; and
   transmitting the modified print job in a transmission addressed to an address of a print server for storing the print data to be printed by the printer.

9. The computer-readable medium as defined in claim 8, wherein the address of the print server is an Internet address.

10. The computer-readable medium as defined in claim 8, wherein the address of the print server is a network address on a bear area network.

11. The computer-readable medium as defined in claim 8, wherein the method further comprises transforming the print data into a format that is required for printing by the printer.

12. A computer-readable medium having computer-executable instructions which, when executed on a processor, direct a computer to perform a method comprising, after a request to print at a printer received by a printer driver application executed by the processor, the printer driver application being invoked by the processor executing a document processing application processing a document that contains information, and wherein the information in the document is processed by the execution of the printer driver application to form a print job containing print data to be printed at the printer;
   accessing user data selected from the group consisting of:
      accounting information corresponding to the user;
      billing information corresponding to the user; and
      a cost corresponding to the print data to be printed at the printer;
   modifying the print job to add the user data; and
   transmitting the modified print job in a transmission addressed to a print queue of print jobs to be printed by the printer.

13. The computer-readable medium as defined in claim 12, wherein the address of the print queue is an Internet address.

14. The computer-readable medium as defined in claim 12, wherein the address of the print queue is a network address on a local area network.

15. The computer-readable medium as defined in claim 12, wherein the method further comprises transforming the print data into a format that is required for printing by the printer.

16. A computer-readable medium having computer-executable instructions which, when executed on a processor, direct a computer to perform a method comprising:
   executing a printer driver application to create print data in a print job, the print data being designated to be printed at a printer, wherein the print data is formed from a document containing information;
   executing a driver-server interface application to modify the print job to add user data selected from the group consisting of:
      accounting information corresponding to the user;
      billing information corresponding to the user; and
      a cost corresponding to the print data to be printed at the printer;
   addressing a transmission including the modified print job to an address of a print server.

17. The computer-readable medium as defined in claim 16, wherein the address of the print server is an Internet address.

18. The computer-readable medium as defined in claim 16, wherein the address of the print server is a network address on a local area network.

19. The computer-readable medium as defined in claim 16, wherein the method further comprises transforming the print data into a format that is required for printing by the printer.

20. The computer-readable medium as defined in claim 16, wherein the method further comprises transmitting the modified print job to the address of the print server.

21. A client device comprising:
  printer driver means for forming a print job containing print data to be printed at a printer;
  means for accessing user data selected from the group consisting of:
    accounting information corresponding to the user;
    billing information corresponding to the user; and
    a cost corresponding to the print data to be printed at the printer;
  means for modifying the print job to include the user data; and
  means for transmitting the modified print job in a transmission addressed to an address of a print queue for the printer at a print server.

22. The client device as defined in claim 21, further comprising means to receive input of at least one of the accounting information and the billing information and selected from the group consisting of credit card information corresponding to the user, debit card information corresponding to the user, and electronic funds transfer information corresponding to the user;
  wherein:
    a quantity corresponding to the print data is derived by the printer driver means as a function of the print data to be number of pages to be printed by the printer; and
    the cost corresponding to the print data to be printed at the printer is derived, at least in part, as a function of the quantity corresponding to the print data.

23. The client device as defined in claim 21, further comprising:
  document processing means for processing a document that contains information;
  means for receiving a request to print the document at the printer;
  means, in response to a request received by the means for receiving a request, for invoking said printer driver means; and
  wherein the printer driver means forms the print data from the information in the document.

24. The client device as defined in claim 21, further comprising means for transforming the print data into a format that is required for printing by the printer.

25. A client device comprising:
  printer driver means for creating print data in a first print job, the print data being designated to be printed at a printer, wherein the print data is formed from a document containing information;
  driver-server interface means for modifying the print job to add user data selected from the group consisting of:
    accounting information corresponding to the user;
    billing information corresponding to the user; and
    a cost corresponding to the print data to be printed at the printer;
  means for addressing a transmission including the modified print job to an address of a print queue for the printer at a print server.

26. The client device as defined in claim 25, further comprising means for transforming the print data into a format that is required for printing by the printer.

27. The client device as defined in claim 25, further comprising means for transmitting the modified print job to the address.

28. A computer-readable medium having computer-executable instructions which, when executed on a processor, direct a computer to perform a method comprising:
  receiving a print job that has been modified so that it includes user data and print data to be printed at a printer, wherein:
    the print data was formed by execution of a printer driver application invoked by the execution of a document processing application processing a document including information;
    the information in the document was processed by the execution of the printer driver application to form the print data;
    the user data is selected from the group consisting of:
      accounting information corresponding to the user;
      billing information corresponding to the user; and
      a cost corresponding to the print data to be printed at the printer;
  storing the print data in a print queue for printing with the printer; and
  performing a billing function using the user data.

29. The computer-readable medium as defined in claim 28, wherein the method further comprises:
  processing one or more print jobs in the print queue including one said print job including the print data; and
  transmitting the print data in the one said print job to the printer to be printed.

30. The computer-readable medium as defined in claim 28, wherein the transmission is received from an Internet address.

31. The computer-readable medium as defined in claim 28, wherein the transmission is received from a network address on a local area network at another network address on the local area network.

32. The computer-readable medium as defined in claim 28, wherein the method further comprises transforming the print data into a format that is required for printing by the printer.

33. A computer-readable medium having computer-executable instructions which, when executed on a processor, direct a computer to perform a method comprising processing a plurality of print jobs in a print queue, each said print job including user data and print data to be printed at a printer, wherein:
  the user data is selected from the group consisting of:
    accounting information corresponding to the user;
    billing information corresponding to the user; and
    a cost corresponding to the print data to be printed at the printer;
  the print data is a product of an execution of a printer driver application; and
  the processing of each said print job includes quantifying use of the printer by the user corresponding to the respective print data of the print job and performing a billing function using the user data and the quantified use with respect to that print job.

34. The computer-readable medium as defined in claim 33, wherein:
  the execution of a printer driver application was invoked by the execution of a document processing application processing a document including information; and the information in the document was processed by the execution of the printer driver application to form the print data.

35. The computer-readable medium as defined in claim 33, wherein the processing of each said print job further comprises transmitting the respective print data to the printer to be printed.

36. The computer-readable medium as defined in claim 33, wherein the method further comprises receiving one or more of the print jobs in the print queue by transmission from an Internet address.

37. The computer-readable medium as defined in claim 33, the method further comprises receiving at a network address on a local area network one or more of the print jobs in the print queue by transmission from another network address on the local area network.

38. The computer-readable medium as defined in claim 33, wherein the processing of each said print job further comprises transforming the respective print data into a format that is required for printing by the printer.

39. A print server comprising:
  means for storing a print queue capable of containing a plurality of print jobs each including user data and print data to be printed at a printer, wherein:
    the user data is selected from the group consisting of:
      accounting information corresponding to the user;
      billing information corresponding to the user;
      and
        a cost corresponding to the print data to be printed at the printer;
    the print data was created by a printer driver means for forming the print data;
  means for quantifying use of the printer by the user corresponding to the respective print data of each said print job in the print queue and performing a billing function using the user data and the quantified use with respect to that print job.

40. The print server as defined in claim 39, wherein:
  the printer driver application means was invoked by a document processing means for processing a document including information; and
  the information in the document was processed by the printer driver means to form the print data in one or more of said print jobs.

41. The print server as defined in claim 39, further comprising means for transmitting the respective print data of each said print job in the print queue to the printer to be printed.

42. The print server as defined in claim 39, further comprising means for receiving, by transmission from an Internet address, one or more of the print jobs for storage in the means for storing the print queue.

43. The print server as defined in claim 39, further comprising means for receiving, by transmission from a network address on a local area network, one or more of the print jobs for storage in the means for storing the print queue, wherein the means for storing the print queue has another network address on the local area network.

44. The print server as defined in claim 39, further comprising means for transforming the respective print data of each said print job into a format that is required for printing by the printer.

45. A system comprising:
  a printer;
  an interconnected network;
  a print server in communication with the printer through the interconnect network and including a server processor in communication with a server memory, the server memory including a print queue for the printer, the server memory having installed thereon a server application;
  a client device in communication with the print server through the interconnected network and including a client processor in communication with a client memory, the client memory having installed thereon a document processing application for processing a document that includes information, a printer driver application, and a driver-server interface application, wherein:
    the client processor executes the document processing application to invoke the printer driver application upon receipt of a request to print the document at the printer;
    the client processor executes the printer driver application to create a print job from the information in the document;
    the client processor executes the driver-server interface application to:
      modify the print job to add user data, the user data being selected from the group consisting of:
        accounting information corresponding to the user;
        billing information corresponding to the user;
        and
        a cost corresponding to the print data to be printed at the printer;
      address a transmission of the modified print job to an address of the print queue; and
      transmit the transmission of the modified print job to the address of the print queue;
    the server processor executes the server application to:
      receive the transmission of the modified print job from the client device through the interconnected network;
      store the print data in the print queue;
      quantify the use of the printer by the user corresponding to the print data in the print queue; and
      perform a billing function using the user data and the quantified use for the print data.

46. The system as defined in claim 45, wherein:
  the server memory further comprises installation software for the driver-server interface application; and
  the client memory further comprises a software installation application that, when executed by the client processor;
    requests and receives, from the server memory through the interconnected network, the installation software; and
    installs in the client memory, from the installation software, the driver-server interface application.

47. The system as defined in claim 45, wherein the interconnected network is the Internet.

48. The system as defined in claim 45, wherein the client device and the print server each have network address on the same local area network.

49. The system as defined in claim 45, wherein the client processor executes the driver-server interface application to:
  receive input of at least one of the accounting information and the billing information and selected from the group consisting of credit card information corresponding to the user, debit card information corresponding to the user, and electronic funds transfer information corresponding to the user;

derive a quantity corresponding to the print data to be number of pages to be printed by the printer as a function of the print data; and derive the cost corresponding to the print data to be printed at the printer, at least in part, as a function of the quantity corresponding to the print data.

* * * * *

UNITED STATES PATENT AND TRADEMARK OFFICE
CERTIFICATE OF CORRECTION

PATENT NO. : 7,689,436 B2 Page 1 of 1
APPLICATION NO. : 10/213171
DATED : March 30, 2010
INVENTOR(S) : Dennis W. Howard It is certified that error appears in the above-identified patent and that said Letters Patent is hereby corrected as shown below:

In column 12, line 15, in Claim 10, delete "bear" and insert -- local --, therefor.

In column 16, line 50, in Claim 46, delete "processor;" and insert -- processor: --, therefor.

Signed and Sealed this

Thirty-first Day of August, 2010

David J. Kappos
*Director of the United States Patent and Trademark Office*